United States Patent [19]

Tamai et al.

[11] 3,915,673

[45] Oct. 28, 1975

[54] METHOD AND APPARATUS FOR SEPARATING GAS MIXTURE BY CENTRIFUGING

[75] Inventors: Kiyoshi Tamai, Tokyo; Hiromi Tsuno; Osamu Hashimoto, both of Tokai-Mura; Takuya Iwai, Tokyo; Kenjiro Shionoya, Kanagawa, all of Japan

[73] Assignee: Doryokuro Kakunenryo Kaihatsu Jigyodan, Tokyo, Japan

[22] Filed: Jan. 24, 1973

[21] Appl. No.: 326,533

Related U.S. Application Data

[63] Continuation-in-part of Ser. No. 22,560, March 25, 1970, abandoned.

[30] Foreign Application Priority Data

Apr. 10, 1969 Japan.............................. 44-27266

[52] U.S. Cl. ...................... 55/17; 55/401; 210/378; 233/18; 233/DIG. 1
[51] Int. Cl............................................ B01d 45/12
[58] Field of Search ....... 55/17, 267, 345, 400, 401, 55/403; 210/378, 326, 335; 233/DIG. 1, 3, 17, 18

[56] References Cited
UNITED STATES PATENTS

| | | | |
|---|---|---|---|
| 717,963 | 1/1903 | Bardolle............................ | 55/17 X |
| 2,779,434 | 1/1957 | Smith................................. | 55/401 X |
| 2,876,949 | 3/1959 | Skarsthom......................... | 55/17 X |
| 3,234,716 | 2/1966 | Sevin et al........................ | 55/401 X |
| 3,277,637 | 10/1966 | Dobney............................. | 55/17 X |
| 3,332,300 | 7/1967 | Nyrop............................... | 210/378 X |
| 3,498,454 | 3/1970 | Timson.............................. | 55/17 X |

Primary Examiner—John Adee
Attorney, Agent, or Firm—Wenderoth, Lind & Ponack

[57] ABSTRACT

A process and a centrifuge are provided for separating a gas mixture having different molecular weights into a light fraction and a heavy fraction. The process comprises the steps of introducing the gas mixture into at least one intermediate space formed between at least two concentric rotors, and separating the gas mixture into a light fraction and a heavy fraction by subjecting the gas mixture to centrifugal forces by rotation of the concentric motors. The centrifuge comprises at least two concentric rotors rotatably in a housing and defining between them one or more intermediate spaces, means for driving the rotors, and means for introducing the gas mixture into the or each intermediate space, whereby in operation the mixture is subjected to centrifugal forces.

11 Claims, 7 Drawing Figures

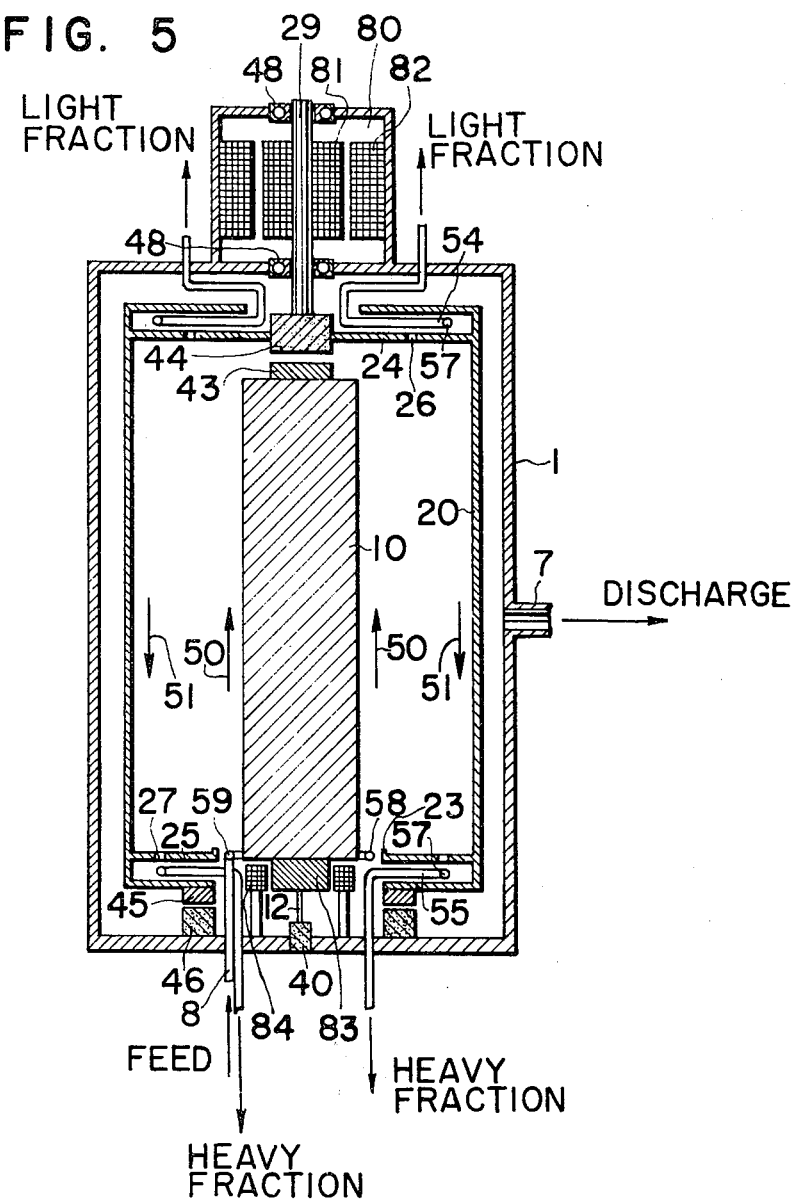

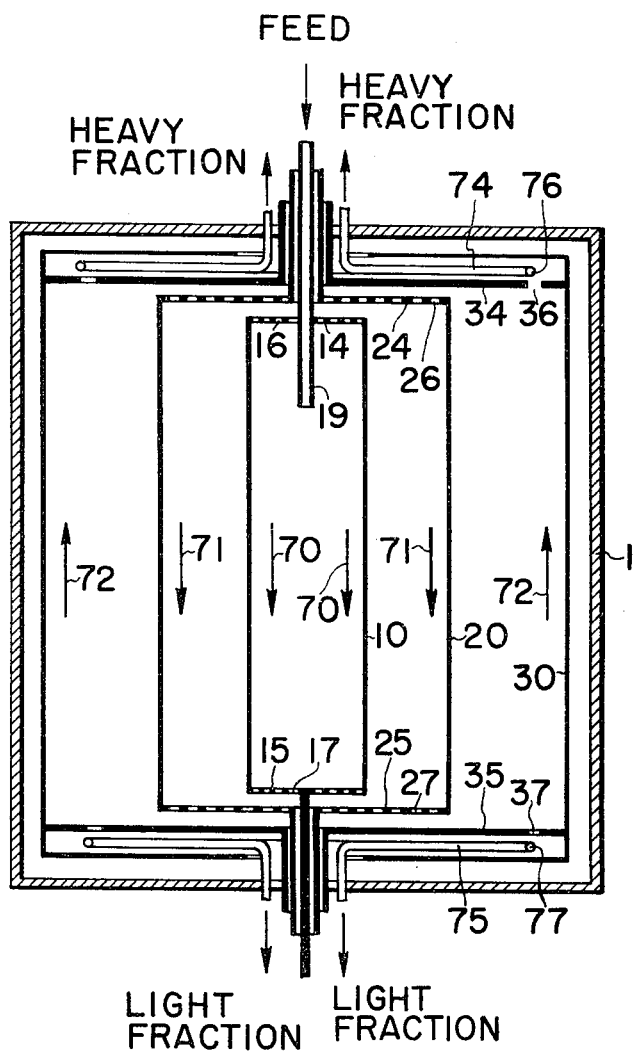

METHOD AND APPARATUS FOR SEPARATING GAS MIXTURE BY CENTRIFUGING

This application is a continuation-in-part of application Ser. No. 22,560 filed Mar. 25, 1970, now abandoned.

BACKGROUND OF THE INVENTION

This invention relates to a method and apparatus for separating gas mixture having different molecular weights.

In a conventional centrifuge, a single hollow rotor is mounted to rotate at a high velocity within a stationary housing, and a gas mixture is introduced into the rotor where it is separated as the gas mixture is subjected to rotational flow at substantially the same angular velocity as that at which the rotor is rotating. In order to obtain as large a centrifugal effect as possible, it is desirable to make peripheral velocity of the single hollow rotor as high as possible. However, the peripheral velocity is limited by the mechanical strength of the material from which the rotor is made. In addition, only a small centrifugal force is exerted on the gas mixture near the axis of the rotor, so that the separation is extremely poor near the center of the rotor.

In the sepration of isotopic gas mixtures, attempts have been made to increase the separation factor by using radiant heat to generate a thermal gradient in the gas mixture in the axial and the radial directions, thereby forming a circular counter-current flow. However, from a practical standpoint, it has been found that separative power is much more important than the separation factor.

SUMMARY OF THE INVENTION

An object of the present invention therefore is to provide a centrifugal process and apparatus for separating a gas mixture having a much better performance than conventional centrifuges.

According to the invention, there is provided a centrifugal process for separating a gas mixture into a light fraction and a heavy fraction comprising the steps of introducing the gas mixture into at least one intermediate space formed between at least two concentric rotors, and separating the gas mixture into a light fraction and a heavy fraction by subjecting the gas mixture to centrifugal forces by rotation of the concentric rotors.

Preferably the speed of revolution of the inner rotor is greater than that of the outer rotor and the ratio of the radius of the inner rotor to that of the outer rotor is small.

The centrifugal process of the present invention is entirely different from conventional ones in that the gas mixture to be separated is introduced into intermediate spaces between adjacent inner and outer rotors and is subjected to centrifugal forces by both rotors. In order to make clear the principles on which the present invention is based, the following theoretical analysis is given with reference to FIGS. 1 and 2 of the accompanying drawings. FIGS. 1 and 2 are diagrams showing respectively the increase factor $L$ of the separation factor and the multiplication factor $E$ of the separative power, for various values of velocity ratio $\gamma$ of the inner rotor to the outer rotor and radius ratio $\eta$ of the inner rotor to the outer rotor. The diagrams refer to a mixture which is separated in an intermediate space formed between concentric inner and outer rotors rotating at high velocity.

With steady state laminar flow symmetrical about the axes of the inner and outer rotors:
Component of velocity in the radial direction $Vr =$ component of velocity in the axial direction $Vz = 0$
Pressure $P$ varies only in the radial direction, $$\frac{\delta P}{\delta \theta} = \frac{\delta P}{\delta z} = 0$$

For the inner rotor (length $Z$, radius $r = R_1$), the component of velocity in the tangential direction $$V\theta = V(r) = V_1 = \Omega_1 R_1 \qquad (2)$$

for the outer rotor (length $Z$, radius $r = R_2$), the component of velocity in the tangential direction $$V\theta = V(r) = V_2 = \Omega_2 R_2 \qquad (3)$$

$\gamma$ and $\eta$ are defined respectively by
$$\gamma = V_1/V_2 \qquad (4)$$

and
$$\eta = R_1/R_2 \qquad (5)$$

The equation of motion of a compressible viscous fluid situated between the two concentric rotors is in cylindrical co-ordinates as follows:

$\gamma$ – component $$\rho \left( \frac{\delta v}{\delta t} + v^r \frac{\delta v^r}{\delta \gamma} + \frac{v\theta}{\gamma} \frac{\delta v^r}{\delta \theta} - \frac{v\theta^2}{\gamma} + vz \frac{\delta v^r}{\delta Z} \right) \qquad (6)$$

$$= -\frac{\delta P}{\delta \gamma} - \left( \frac{1}{\gamma} \frac{\delta}{\delta \gamma}(\gamma \tau rr) + \frac{1}{\gamma} \frac{\delta \tau^r \theta}{\delta \theta} - \frac{\tau\theta\theta}{\gamma} + \frac{\delta \tau^r z}{\delta Z} \right)$$

$\theta$ – component $$\rho \left( \frac{\delta v\theta}{\delta t} + v^r \frac{\delta v\theta}{\delta \gamma} + \frac{v\theta}{\gamma} \frac{\delta v\theta}{\delta \theta} + \frac{v^r v\theta}{\gamma} + vz \frac{\delta v\theta}{\delta Z} \right)$$

$$= -\frac{1}{\gamma} \frac{\delta P}{\delta \theta} - \left( \frac{1}{\gamma^2} \frac{\delta}{\delta \gamma}(\gamma^2 \tau^r \theta) + \frac{1}{\gamma} \frac{\delta \tau\theta\theta}{\delta \theta} + \frac{\delta \tau\theta z}{\delta Z} \right) \qquad (7)$$

$Z$ – component $$\rho \left( \frac{\delta vz}{\delta t} + v^r \frac{\delta vz}{\delta \gamma} + \frac{v\theta}{\gamma} \frac{\delta vz}{\delta \theta} + vz \frac{\delta vz}{\delta Z} \right)$$

$$= -\frac{\delta P}{\delta Z} - \left( \frac{1}{\gamma} \frac{\delta}{\delta \gamma}(\gamma \tau^r z) + \frac{1}{\gamma} \frac{\delta \tau\theta z}{\delta \theta} + \frac{\delta \tau zz}{\delta Z} \right) \qquad (8)$$

wherein $$\tau rr = -\mu \left[ 2 \frac{\delta vr}{\delta \gamma} - \frac{2}{3} (\nabla v) \right] \qquad (9)$$

$$\tau\theta\theta = -\mu \left[ 2\left( \frac{1}{\gamma} \frac{\delta v\theta}{\delta\theta} + \frac{vr}{\gamma} \right) - \frac{2}{3}(\nabla v) \right] \quad (10)$$

$$\tau zz = -\mu \left[ 2 \frac{\delta vz}{\delta Z} - \frac{2}{3}(\nabla v) \right] \quad (11)$$

$$\tau r\theta = \tau\theta r = -\mu \left[ \gamma \frac{\delta}{\delta\gamma}\left(\frac{\delta v\theta}{\gamma}\right) + \frac{1}{\gamma} \frac{\delta vr}{\delta\theta} \right] \quad (12)$$

$$\tau\theta z = \tau z\theta = -\mu \left[ \frac{\delta v\theta}{\delta Z} + \frac{1}{\gamma} \frac{\delta vz}{\delta\theta} \right] \quad (13)$$

$$\tau zr = \tau rz = -\mu \left[ \frac{\delta vz}{\delta\gamma} + \frac{\delta vr}{\delta Z} \right] \quad (14)$$

$$(\nabla v) = \frac{1}{\gamma} \frac{\delta}{\delta\gamma}(\gamma Vr) + \frac{1}{\gamma} \frac{\delta V\theta}{\delta\theta} + \frac{\delta Vz}{\delta Z} \quad (15)$$

in which $\rho$ is density and $\mu$ is a viscosity coefficient.

Details are shown in "TRANSPORT PHENOMENA" (1960) page 71 – 91, (John Wiley & Sons) by R. B. Bird, W. E. Stewart, E. N. Lightfoot.

From the equations (1) and (7)

$$-\frac{1}{\gamma^2} \frac{d}{d\gamma}(\gamma^2 \tau r\theta) = 0$$

setting C as a constant of integration, $\tau r\theta = C/r^2$
From the equations (1) and (12)

$$\frac{d}{d\gamma}\left(\frac{V(\gamma)}{\gamma}\right) = -\frac{C}{\mu\gamma^3}$$

that is $$V(r) = \frac{A}{\gamma} + Br$$

in which $$A = \frac{(\gamma-\eta)\eta R2}{1-\eta^2} V2$$

$$B = \frac{(1-\gamma\eta)V2}{(1-\eta^2)R2}$$

Therefore, the equation of velocity distribution of gas between the inner and the outer rotors is:

$$V(r) = \left\{ \frac{(\gamma-\eta)\eta}{1-\eta^2} \frac{R2}{\gamma} + \frac{(1-\gamma\eta)}{1-\eta^2} \frac{\gamma}{R2} \right\} V2 \quad (16)$$

When one of the rotors rotates in the opposite direction with respect to the other rotor, the sign of $\gamma$ has to be reversed. With the sign of $\gamma$ reversed, there exists a velocity reverse position where $V(r) = 0$ determined by $$\gamma = \sqrt{\frac{(\gamma+\eta)\eta}{1+\gamma\eta}} R2$$

The rotational velocity $Vs(r)$ of gas in a conventional centrifuge in which a single hollow rotor of radius $R_2$ rotates at a peripheral velocity $V_2 = \Omega_2 R_2$ is:

$$Vs(r) = \frac{V2}{R2} \gamma \quad (17)$$

Therefore, the ratio of $V(r)$ to $Vs(r)$ is:

$$\frac{V(r)}{Vs(r)} = \frac{1-\gamma\eta}{1-\eta^2} + \frac{(\gamma-1\eta)\eta R_2^2}{1-\eta^2} \cdot \frac{1}{r^2}$$

so that in the present gas centrifuge having two concentric rotors, a larger rotational flow is to be expected than is obtained in a conventional centrifuge having only a single hollow rotor, the ratio between the two being given by the right-hand expression in the above equation.

From the equations (1) and (6):

$$-\rho \frac{V(r)^2}{\gamma} = \frac{dP}{dr}$$

when the value of $V(r)$ obtained from the equation (15) and the equation of state of ideal gas $\eta = MP/RT$ are inserted into the above equation, ($M$ is molecular weight, $R$ is the gas constant and $T$ is absolute temperature), $$\frac{dP}{P} = \frac{MV_2^2}{RT}\left\{\frac{(r-\eta)^2 \eta^2 R_2^2}{(1-\eta^2)^2 r^3} + 2\frac{(r-\eta)(1-r\eta)\eta}{(1-\eta^2)^2} \cdot \frac{1}{r} + \frac{(1-r\eta)^2 r}{(1-\eta^2)^2 R_2^2}\right\} dr \quad (18)$$

$$\int_{P_1}^{P}\frac{dP}{P} = \frac{MV_2^2}{RT}\int_{R_1=\eta R_2}^{R}\left\{\frac{(r-\eta)^2\eta^2 R_2^2}{(1-\eta^2)^2 r^3} + 2\frac{(r-\eta)(1-r\eta)\eta}{(1-\eta^2)^2}\cdot\frac{1}{r} + \frac{(1-r\eta)^2}{(1-\eta^2)^2}\frac{r}{R_2^2}\right\}dr$$

$$\ln\frac{P}{P_1} = \frac{MV_2^2}{2RT}\left\{\frac{(r-\eta)^2\eta^2 R_2^2}{(1-\eta^2)^2}\left(\frac{1}{\eta^2 R_2^2}-\frac{1}{R^2}\right) + \frac{4(r-\eta)(1-r\eta)}{(1-\eta^2)^2}\ln\frac{R}{\eta R_2}\right.$$

$$\left. - \frac{(1-r\eta)^2}{(1-\eta^2)^2 R_2^2}(R^2-\eta^2 R_2^2)\right\} \quad (18')$$

From equations (18) and (18)', the ratio of the pressure $P_1$ at the outer surface of the inner rotor to the pressure $P_2$ at the inner surface of the outer rotor is given by:

$$\ln\frac{P_2}{P_1} = \frac{MV_2^2}{2RT}\left\{\frac{(\gamma-\eta)^2}{1-\eta^2} + \frac{4\eta(\gamma-\eta)(1-\gamma\eta)}{(1-\eta^2)^2}\ln\frac{1}{r} + \frac{(1-\gamma\eta)^2}{1-\eta^2}\right\} \quad (19)$$

In a conventional centrifuge having a hollow rotor rotating at a velocity $V_2$, the ratio of pressure $Pw$ at the wall of the rotor to the pressure $Pc$ at the center of the rotor is known to be given by:

$$\ln\frac{Pw}{Pc} = \frac{MV_2}{2RT}$$

Therefore:

$$\frac{ln(P_2/P_1)}{ln(P_w/P_c)} = \frac{(\gamma-\eta)^2}{1-\eta^2} + \frac{4\tau(\gamma-\eta)(1-\gamma\eta)}{(1-\eta^2)^2} ln\frac{1}{\tau}$$
$$+ \frac{(1-\gamma\eta)^2}{1-\eta^2} \equiv L \quad (20)$$

From equation (20), it will be seen that the pressure ratio in the intermediate space between the two rotors is large compared with that of the pressure ratio in a conventional centrifuge.

When a mixed gas of two components $(i, j)$ is separated in a centrifuge having a single hollow rotor, the equilibrium separation factor $\alpha$ so is defined as the ratio between the abundance ratio $Wc$ of the desired gas component $(i)$ at the center of the rotor to the other gas component $(j)$ and the abundance ratio $Ww$ of the desired gas component $(i)$ at the wall portion of the rotor to the other gas component $(j)$. For a gas of two components with different molecular weights $Mj$, $Mi$ ($Mj > Mi$), the following equation holds (the peripheral velocity of the single rotor is $V_2$):

$$\alpha_{so} = \frac{Wc}{Ww} = \exp\left[\frac{(Mj-Mi)V_2^2}{2RT}\right] \quad (21)$$

The equilibrium separation factor $\alpha DO$ of a gas centrifuge in which a mixed gas of two components $(i,j)$ is separated by two concentric rotors, is taken as the ratio between the abundance ratio $W_1$ of the desired gas component $(i)$ near the outer surface of the inner rotor to the other gas component $(j)$ and the abundance ratio $W_2$ of the desired gas component existing near the inner surface of the outer rotor to the other gas component. Thus:

$$\alpha_{DO} = \frac{W_1}{W_2} = \frac{Pi_1/Pj_1}{Pi_2/Pj_2} \quad (22)$$

$$ln\alpha_{DO} = ln\frac{Pj_2}{Pj_1} - ln\frac{Pi_2}{Pi_1}$$

From equation (19):

$$ln\alpha_{DO} = \frac{(Mj-Mi)V_2^2}{2RT}\left\{\frac{(\gamma-\eta)^2}{1-\eta^2} + \frac{4\eta(\gamma-\eta)(1-\gamma\eta)}{(1-\eta^2)^2} ln\frac{1}{\eta}\right.$$
$$\left.+ \frac{(1-\gamma\eta)^2}{\eta^2}\right\} = \frac{(Mj-Mi)V_2^2}{2RT} \cdot L \quad (23)$$

hence:

$$L = \frac{(\gamma-\eta)^2}{1-\eta^2} + \frac{4\eta(\gamma-\eta)(1-\gamma\eta)}{(1-\eta^2)^2} ln\frac{1}{\eta} + \frac{(1-\gamma\eta)^2}{1-\eta^2} \quad (23')$$

$L$ is defined herein as the increase factor of the separation factor.

Therefore, the relation between the two equilibrium separation factors $\alpha DO$ and $\alpha SO$ is given by:

$$\alpha DO = \alpha SO^L \quad (24)$$

The way in which $L$ varies with variation of $\gamma$ and $\eta$ is shown in FIG. 1. As is apparent from the diagram, the larger the value of $\gamma$ becomes and/or the smaller the value of $\eta$ becomes, the larger is the equilibrium separation factor that can be obtained.

The separative power $\delta U$ is used as a parameter to evaluate the performance, including the degree of separation and the treating capacity, of the various centrifuges. Details are given by Karl Cohen in "The Theory of Isotope Separation as Applied to the Large-Scale Production of $U^{235}$" (1951) (McGraw-Hill). In the book, as a standard model of separation when $G$ moles of a mixture containing $\tau$ moles of the desired material is transferred by separation from a lower reservoir in which there are $M$ moles of a mixture in which the mole fraction of the desired material is $Ni$ to an upper reservoir in which there are $M'$ moles of a mixture in which the desired material is $N'i$ ($>Ni$), the separative power $\delta U$ (when $Ni \gg \nabla Ni$, $N'i \gg \nabla N'i$, and $\nabla Ni = N'i - Ni$) is:

$$\delta U = \frac{(\tau-NiG)(N'i-Ni)}{Ni^2(1-Ni)^2} = \frac{(\tau-NiG)\nabla Ni}{Ni^2(1-Ni)^2} \quad (25)$$

in which $\nabla Ni$ is a minute variation of the desired material. In the above equation, $(\tau - NiG)$ is the net quantity of the desired material transferred.

Now when a mixed gas of two components $(i,j)$ existing between the two rotors rotates uniformly as a laminar stream at a constant temperature and when the relation $Vr = Vz = 0$ exists, the net molar flux of the desired material transferred through a certain area element $(ds)$ by centrifugal effect is:

$$\left(\vec{\eta} \cdot \frac{\eta i}{NA} \vec{Vi}\right) ds = \left(\vec{\eta} \cdot \frac{PD}{RT}\right.$$
$$\left.\left[-\nabla Ni - \frac{(Mi-Mi)Ni(1-Ni)}{M} \vec{\nabla lnPro}\right]\right) ds$$

in which
$\vec{\eta}$ : is normal unit vector of area $(ds)$,
$\eta i$ : is the number density of the desired material,
$NA$ : is Avogadro's number,
$\vec{Vi}$ : is the diffusion velocity of the desired material,
$D$ : is the diffusion coefficient,
$\vec{ro}$ : is the radial unit vector.

Therefore, the net quantity of desired material transferred in a volume element $(dsdh)$ is:

$$\frac{PD}{RT}\left[-\nabla Ni - \frac{(Mj-Mi)Ni(1-Ni)}{M} \vec{\nabla lnPro}\right] ds \cdot dh$$

which equation corresponds to $(\tau - NG)$ in the equation (25), so that the separative power $(\delta U)_D$ of the concentric two rotors in question becomes from the equation (25).

$$(\delta U)_D = \frac{\frac{PD}{RT}\left[-\nabla Ni - \frac{(Mj-Mi)Ni(1-Ni)}{M} \vec{\nabla lnPro}\right] ds \cdot dh \cdot \nabla Ni}{Ni^2(1-Ni)^2} \quad (26)$$

From the equation (18), $\nabla lnP = 1/dr \, (dP/P)$ in the equation (26) becomes:

$$\nabla \ln p = \frac{M V_2^2}{RT} \left[ \frac{(\gamma-\eta)^2 r^2}{(1-\eta^2)^2 r^2} + 2 \frac{(\gamma-\eta)(1-\gamma\eta)}{(1-\eta^2)^2} \frac{1}{r} \right.$$
$$\left. + \frac{(1-\gamma\eta)^2 r}{(1-\eta^2)^2 R_2^2} \right] = \frac{MV_2^2}{RT} \left\{ I \frac{1}{r^3} + J \frac{1}{r} + Kr \right\} \quad (27)$$

in which $$I \equiv \frac{(\gamma-\eta)^2 R_2^2}{(1-\eta^2)^2}$$
$$J \equiv 2 \frac{(\gamma-\eta)(1-\gamma\eta)\eta}{(1-\eta^2)^2}$$
$$K \equiv \frac{(1-\gamma\eta)^2}{(1-\eta^2)^2 R_2^2}$$

When the equation (27) is substituted for $\nabla \ln p$ in the equation (26), $$(\delta U)_o = \frac{\left[\frac{PD}{RT} - \nabla Ni - \frac{(Mj-Mi)Ni(1-Ni)V_2^2}{RT} \left\{ I \frac{1}{r^3} + J \frac{1}{r} + K\gamma \right\} \overrightarrow{ro} \right] \nabla Ni \cdot ds \cdot dh}{Ni^2(1-Ni)^2} \quad (28)$$

In the equation (28), where $\nabla Ni$ is variable, the conditions for $(\delta U)_D$ to show the maximum value is:

$$\nabla Ni = -\frac{(Mj-Mi)Ni(1-Ni)V_2^2}{2RT} \left\{ I \frac{1}{r^3} + J \frac{1}{r} + K\gamma \right\} \overrightarrow{ro}$$

Then:

$$(\delta U \max)_{\sigma} = \frac{PD}{RT} \left[ \frac{(Mj-Mi)}{2RT} V_2^2 \right]^2 \left\{ I \frac{1}{r^3} + J \frac{1}{r} + K\gamma \right\}^2 ds \cdot dh \quad (29)$$

Now, setting the length of both inner and outer rotors of the concentric double rotor as $z$, when the above equation (29) is integrated over the entire intermediate space between the rotors:

$$(\delta U_{max})_D = \frac{PD}{RT} \left( \frac{(M_j-M_i)V_2^2}{2RT} \right)^2 2\pi \int_{R_1=\eta R_2}^{R_2} \left\{ \frac{I}{r^3} + \frac{J}{r} + Kr \right\} r \cdot dr \int_0^z dh \quad (30)$$

The integral of the first term on the right side is:

$$\int_{R_1=\eta R_2}^{R_2} \left\{ \frac{I}{r^3} + \frac{J}{r} + Kr \right\}^2 r \cdot dr$$

$$= \frac{1}{(1-\eta^2)^4} \left[ \frac{1}{4}(1-\eta^4)\{(\gamma-\eta)^4+(1-\gamma\eta)^4\} \right.$$
$$+2\eta(1-\eta^2)(\gamma-\eta)(1-\gamma\eta)\{(\gamma-\eta)^2+(1-\gamma\eta)^2\}$$
$$\left. +6(\gamma-\eta)^2(1-\gamma\eta)^2 \ln \frac{1}{\eta} \right] \quad (31)$$

and the integral of the second term on the right side is:

$$\int_0^z dh = Z$$

Thus, the maximum value of the theoretical separative power obtained in the gas centrifuge having two concentric rotors is given by:

$$(\delta U_{max})_D = \frac{4\pi PDZ}{2RT} \left[ \frac{(M_j-M_i)V_2^2}{2RT} \right]^2$$
$$\frac{1}{(1-\eta^2)^4} \left[ \frac{1}{4}(1-\eta^4)\{(\gamma-\eta)^4 + (1-\gamma\eta)^4\} + 2\eta(1-\eta^2) \right.$$
$$(\gamma-\eta)(1-\gamma\eta)\{(\gamma-\eta)^2+(1-\gamma\eta)^2\}$$
$$\left. +6(\gamma-\eta)^2(1-\gamma\eta)^2 \ln \frac{1}{\eta} \right] \quad (32)$$

The maximum value of theoretical separative power obtained in a gas centrifuge in which the same mixed gas of two components $(i, j)$ is rotated in the single hollow rotor at the same peripheral velocity $V_2$ is:

$$(\delta U \max)_s = \frac{\pi PDZ}{2RT} \left[ \frac{(M_j-M_i)V_2^2}{2RT} \right]^2 \quad (33)$$

When the both separative powers are compared on the assumption that all properties of the mixed gases and the temperature conditions are the same in the two cases:

$$\frac{(\delta U_{max})_D}{(\delta U_{max})_S} = \frac{4}{(1-\eta^2)^4} \left[ \frac{1}{4}(1-\eta^4)\{(\gamma-\eta)^4 + (1-\gamma\eta)^4\} + 2\eta(1-\eta^2)(\gamma-\eta)(1-\gamma\eta) \right.$$
$$\{(\gamma-\eta)^2+(1-\gamma\eta)^2\} + 6(\gamma-\eta)^2$$
$$\left. (1-\gamma\eta)^2 \eta^2 \ln \frac{1}{\eta} \right] \quad (34)$$

$\equiv E$: multiplication factor of separative power.

That is, it can be expected that the maximum value of theoretical separative power obtained in a gas centrifuge having two concentric rotors will be greater than that obtained in a gas centrifuge in which a single rotor is rotating at the same velocity as the outer rotor by a factor of $E$.

FIG. 2 shows values of $E$ for various values of $\gamma$ and $\eta$. As is apparent from FIG. 2, the value of $E$ is large when $\gamma$ is positive and $\eta$ is at about 1/5, and varies greatly with variation of $\gamma$ in the positive direction.

Though the above-mentioned explanation has been given for a centrifuge having only a single intermediate space between the inner and the outer rotors, the above theory can be extended to a centrifuge having two or more intermediate spaces formed between multiple concentric rotors. The equilibrium separation factor $\alpha$ $m'o$ and the maximum separative power $(\delta U)$ max.m' for this case are $$\alpha_{m'o} = \alpha_{1,2,o} \times \alpha_{2,3,o} \times \cdots \times \alpha_{n-2,n-1,o} \times \alpha_{n-1,n,o} \quad (35)$$

$$(\delta U)_{max \cdot m'} = \sum_{K=1}^{n} (\delta U)_{max \cdot K-1, K} \quad (36)$$

On application of the equations (23) and (32), the following substitutions are required:

$$V_x \rightarrow V_k; \quad \gamma = \frac{V_k}{V_{k+1}}; \quad \eta = \frac{R_k}{R_{k+1}}$$

As a modification of the present invention, the innermost rotor of the centrifuge can be used just like a conventional centrifuge. The equilibrium separation factor and the maximum separative power of such a centrifuge thereby become larger. The equilibium separation factor $\alpha_{mo}$ and the maximum separative power $(\delta U)_{max}$ are obtained in accordance with the following expression:

$$\alpha_{mo} = \alpha_{1,2,o} \times \alpha_{2,3,o} \times$$
$$\cdots \times \alpha_{n-2,n-1,o} \times \alpha_{n-1,n,o} \times \epsilon \quad (37)$$

$$(\delta U)_{max} = \sum_{k=2}^{n} (\delta U)_{max \cdot k-1, k} + \sigma \quad (38)$$

$\epsilon$ = Equilibrium separation factor of the inside of the innermost rotor = $\exp[(Mj-Mi)V_1^2/2RT]$
$\sigma$ = maximum separative power of the inside of the innermost rotor = $\pi PDZ/2RT \cdot [(Mj-Mi)V_1^2/2RT]^2$ A conventional gas centrifuge can be made in which a rotor of 400 mm in diameter made of high-strength aluminium alloy containing copper and magnesium (Trade Mark "Duralumin") or a reinforced plastics material is rotated at 350 m/s. which is the maximum peripheral velocity allowable in practice. Now, consider the present gas centrifuge in which an inner rotor (not hollow) of 80 mm in diameter made of the same material as mentioned above is mounted in the conventional hollow rotor and is rotated at 700 m/s, which is the maximum peripheral velocity allowable in practice. In the present gas centrifuge, $\gamma$ is 2 and $\eta$ is 0.2, so that $L = 6$ from FIG. 1 and $E = 20$ from FIG. 2. That is, the separation factor of the gas centrifuge having the double rotor is the sixth power of that of the conventional one and, in addition, the separative power of the present gas centrifuge is 20 times as much as the conventional one, thus providing an excellent result.

Therefore, when it is desired to separate a material such as uranium hexafluroide which has needed a great number of conventional centrifuges, the centrifuge of the present invention can simplify the operation and maintenance of a cascade of centrifuges, as the number of centrifuges arranged in parallel and the number of steps arranged in series are reduced.

In a series type operation of the centrifuge according to the present invention, a gas mixture introduced into the innermost intermediate space is separated into a heavy fraction and a light fraction and the heavy fraction is then discharged outside of the centrifuge. Only the light fraction is introduced into the outwardly adjacent intermediate space and then the separation into a light fraction and a heavy fraction is performed again, these steps being repeated so that a continuous gas flow in series takes place from the innermost intermediate space to the outermost intermediate space. In a parallel type operation of the centrifuge according to the present invention, the gas mixture to be separated is introduced in parallel into each of the intermediate spaces. The gas mixture in each space is concurrently subjected to centrifugal force by the inner and the outer rotors which form each intermediate space and is separated into the heavy fraction and the light fraction, these fractions being discharged separately. Another type of operation of centrifuge can be used which is a combination of the series type and the parallel type.

In the above description of the series type of centrifuge, although the heavy fractions separated in each intermediate space are directly discharged outside of the centrifuge, these fractions in the intermediate spaces except the innermost intermediate space may be introduced into each inwardly adjacent intermediate space where the heavy fraction is separated into a heavy fraction and a light fraction. These latter heavy and light fractions are further introduced into the inwardly and outwardly adjacent intermediate spaces, respectively. Thus forming a self-cascade, the heavy fraction and the light fraction are separated from the innermost and the outermost intermediate spaces, respectively. As a modification of the series type, the gas mixture may be introduced in one of the intermediate spaces. One of fractions separated in the intermediate space, for example light fraction, is introduced into the outwardly adjacent intermediate space where it is separated into a light fraction and a heavy fraction which are in turn introduced into the outwardly adjacent and the inwardly adjacent, i.e., original, intermediate space, respectively. The other of the fractions separated in the original intermediate space, for example heavy fraction, is introduced into the inwardly adjacent intermediate space where it is separated into a light fraction and a heavy fraction which are in turn introduced into the outwardly adjacent, i.e., original, and the inwardly adjacent intermediate spaces, respectively. Thus, the heavy fraction is collected in the innermost intermediate space and discharged therefrom, while the light fraction is collected in the outermost intermediate space and discharged therefrom.

When the centrifuge according to this invention is to be used for separating isotopes of gas of large molecular weight such as uranium hexa-fluoride, it is preferable to add a light gas such as helium to the feed flow. Without the light gas, the periphery of the inner rotor is at an extremely low pressure, resulting in slipping between the inner rotor and the uranium hexafluoride. Addition of the light gas will eliminate the possibility of detracting from the centrifugal effect in this way.

A circular counter-current flow which is effective for separating the gas mixture can be formed in each intermediate space. Both the light and heavy fractions in each rotor may be taken out by scoops having holes in a Pitot tube or by ejecting the components from holes provided in end plates of the rotors. A high speed of revolution of each of the concentrically arranged rotors is effected by high-frequency motors and or turbines for each rotor or by a conventional power transmission device for rotating one or more rotors, for example by a gear train.

BRIEF DESCRIPTION OF THE DRAWINGS

Centrifuges according to this invention will now be described with reference to the accompanying drawings, in which:

FIGS. 3 to 7 are cross-sectional views of centrifuges according to different embodiments of the invention.

DETAILED DESCRIPTION OF THE INVENTION

Figure 1:
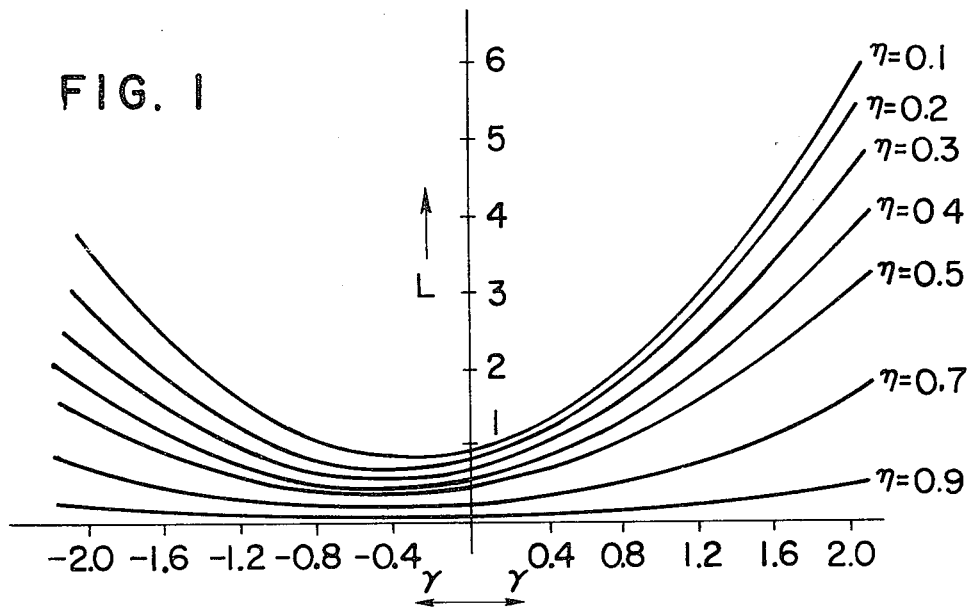
FIG. 1 is a graph illustrating increase in the separation factor $L$ versus various values of the ratios $\gamma$ between velocities of the inner rotor and the outer rotor at varying ratios $\eta$ between the radii of the inner rotor and the outer rotor.

In the drawings, like reference numerals designate like or equivalent parts throughout the figures.

Figure 3:
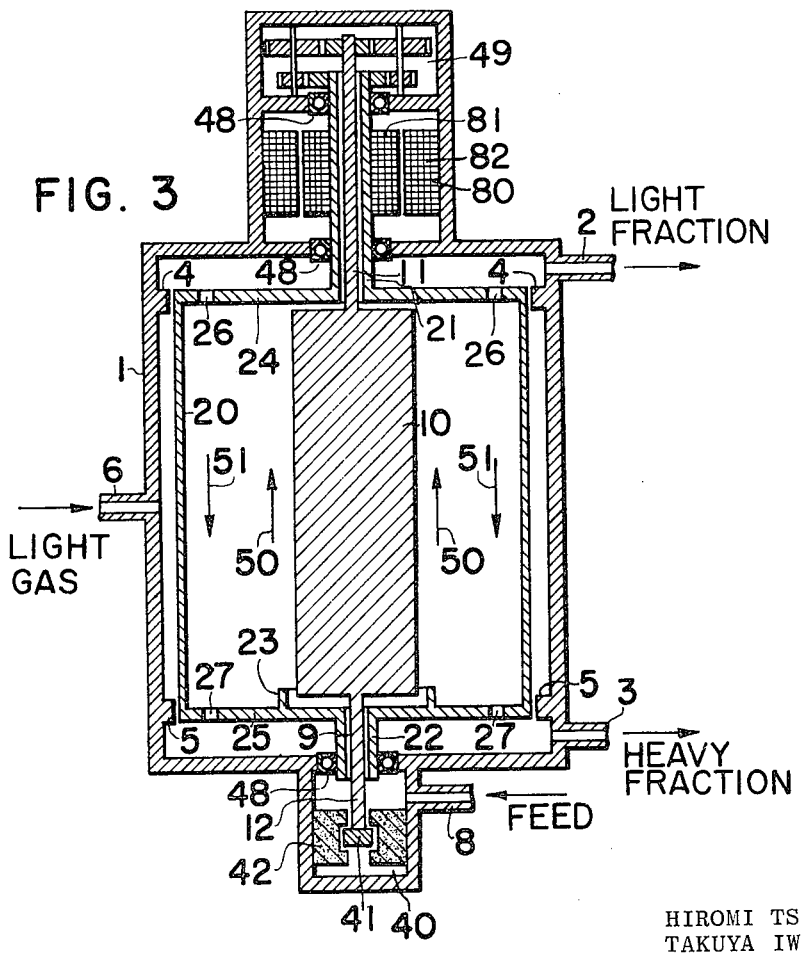
Figure 4:
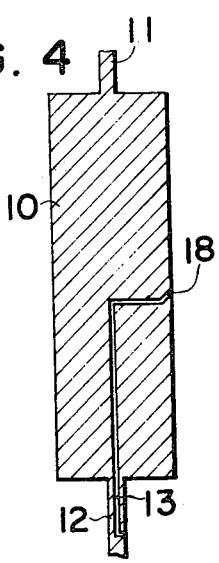
Figure 2:
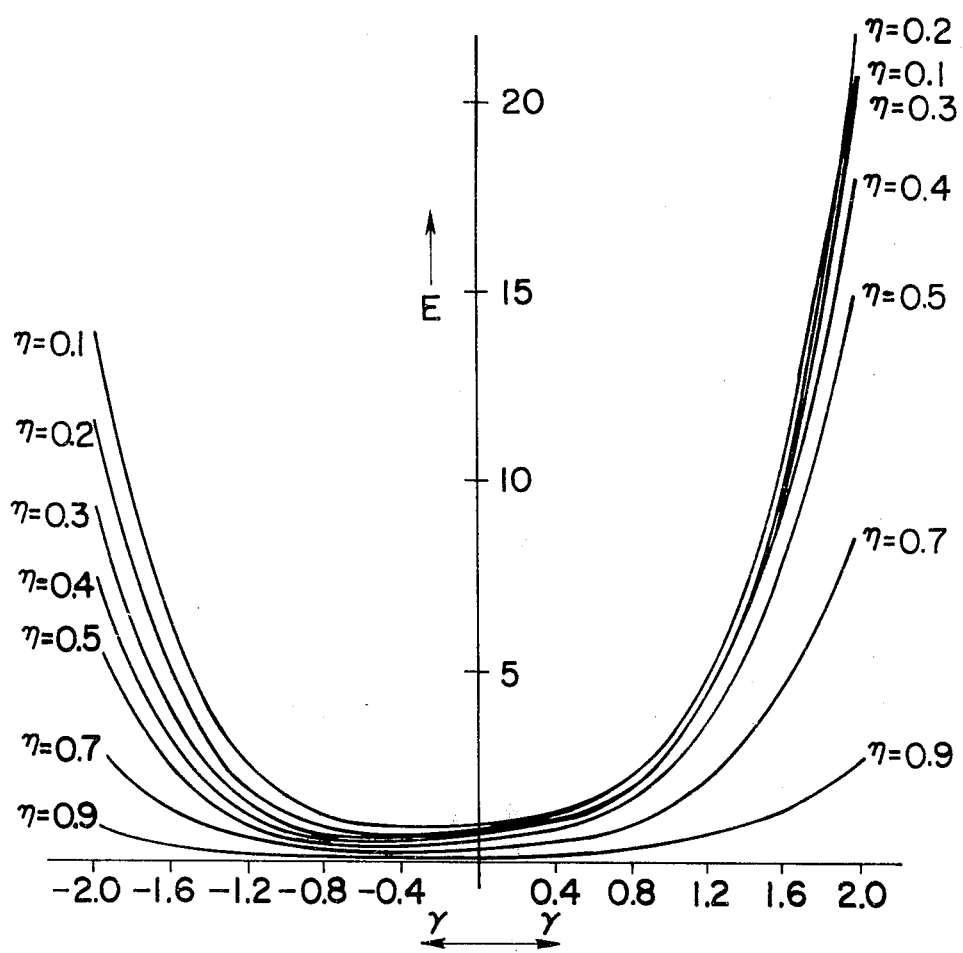
FIG. 2 is a graph illustrating increase in the multiplication factor $E$ versus various values of the ratios $\gamma$ between velocities of the inner rotor and the outer rotor at varying ratios $\eta$ between the radii of the inner rotor and the outer rotor.

FIGS. 3 to 5 show centrifuges having two concentrically mounted rotors. In the arrangement in FIG. 3, a stationary centrifuge housing 1 contains a first cylindrical rotor 10 and a second cylindrical rotor 20 rotatable at a high velocity about a vertical axis of the housing. Upper and lower shafts 11 and 12 of the first rotor pass through upper and lower hollow shafts 21 and 22 of the second rotor, respectively. A cylindrical iron member 41 at the lower end of the shaft 12 forms a magnetic bearing 40 together with a magnet 42 surrounding the iron member. Bearing devices 48 mounted on the housing and serving both as bearings and seals, support the shafts 21 and 22 of the second rotor 20. A high-frequency motor 80 comprising a rotor device 81 fixed to the shaft 21 of the second rotor and a stator 82 provided in the upper portion of the housing 1 causes the second rotor 20 to rotate at a high velocity. A gear system 49 connecting the shaft 21 of the second rotor with the shaft 11 of the first rotor rotates the first rotor 10 in the same direction to the second rotor 20 at a velocity greater than that of the second rotor. Instead of the gear device, the first rotor may be rotated by another high-frequency motor. In an example shown in FIG. 5, a rotor device 83 is fixed to the bottom of the first rotor and thereby forming together with a stator 84 a high-frequency motor for rotating the first rotor.

In the embodiment of FIG. 3, a gas mixture to be separated is introduced into the housing 1 through a pipe 8, and after passing through an annular passage formed between the hollow shaft 22 of the second rotor which has a hollow enclosure and the shaft 12 of the first rotor, the gas mixture is led into an intermediate space between the first rotor 10 and the second rotor by a guide ring 23 that projects inwardly from an end plate 25 of the second rotor. The ring guides the gas mixture along the first rotor. The gas mixture may alternatively be fed into the intermediate space by injecting the mixture through feed nozzles 18 which diverge radiantly from a fine passage 13 or conduit passing partially through the center portion of the shaft 12 as shown in FIG. 4 or, alternatively, by a feed pipe 58 that extends in an elongated manner from the pipe 8 to surround the lower end of the first rotor and that is provided with slits or multiple apertures 59 around the entire circumference thereof as shown in FIG. 5.

In FIG. 5, the first rotor 10 is supported by a magnetic bearing comprising an iron member 43 at the upper end of the first rotor and a magnet 44 on the second rotor 20, and by a pivot bearing 40. The second rotor 20 is supported by an annular iron member 45 and an annular magnet 46. A high-frequency motor 80 rotates a shaft 29 having the magnet 44 fixed integrally therewith.

In order that such a gas flow as shown by arrows 50 and 51 may occur, a known device for generating temperature difference of the gas in the rotor may be fitted in the centrifuge. The device is omitted from the drawings as it does not constitute a part of the invention.

The gas mixture in the intermediate space between the first rotor 10 and the second rotor 20 is simultaneously subjected to the centrifugal forces of the two rotors. In FIG. 3, a light fraction is ejected through fine holes 26 formed near the circumference of the upper end plate 24 and a heavy fraction is ejected through fine holes 27 formed near the circumference of the lower end plate 25. These fractions are withdrawn through pipes 2 and 3, respectively, provided in the housing 1. To prevent the light and the heavy fractions from being remixed in the space between the housing 1 and the second rotor 20, a light gas, for example helium, is fed through a conduit pipe 6 into the space between seals 4 and 5 which project inwardly from the inner wall of the housing 1. The seals and the introduction of the light gas may be eliminated when the light and the heavy fractions are, as shown in FIG. 5, withdrawn through scoops 54 and 55, respectively, having holes 56 and 57. Pitot tubes may be used for this purpose. The embodiment of FIG. 5 has a discharge tube 7.

Figure 6:
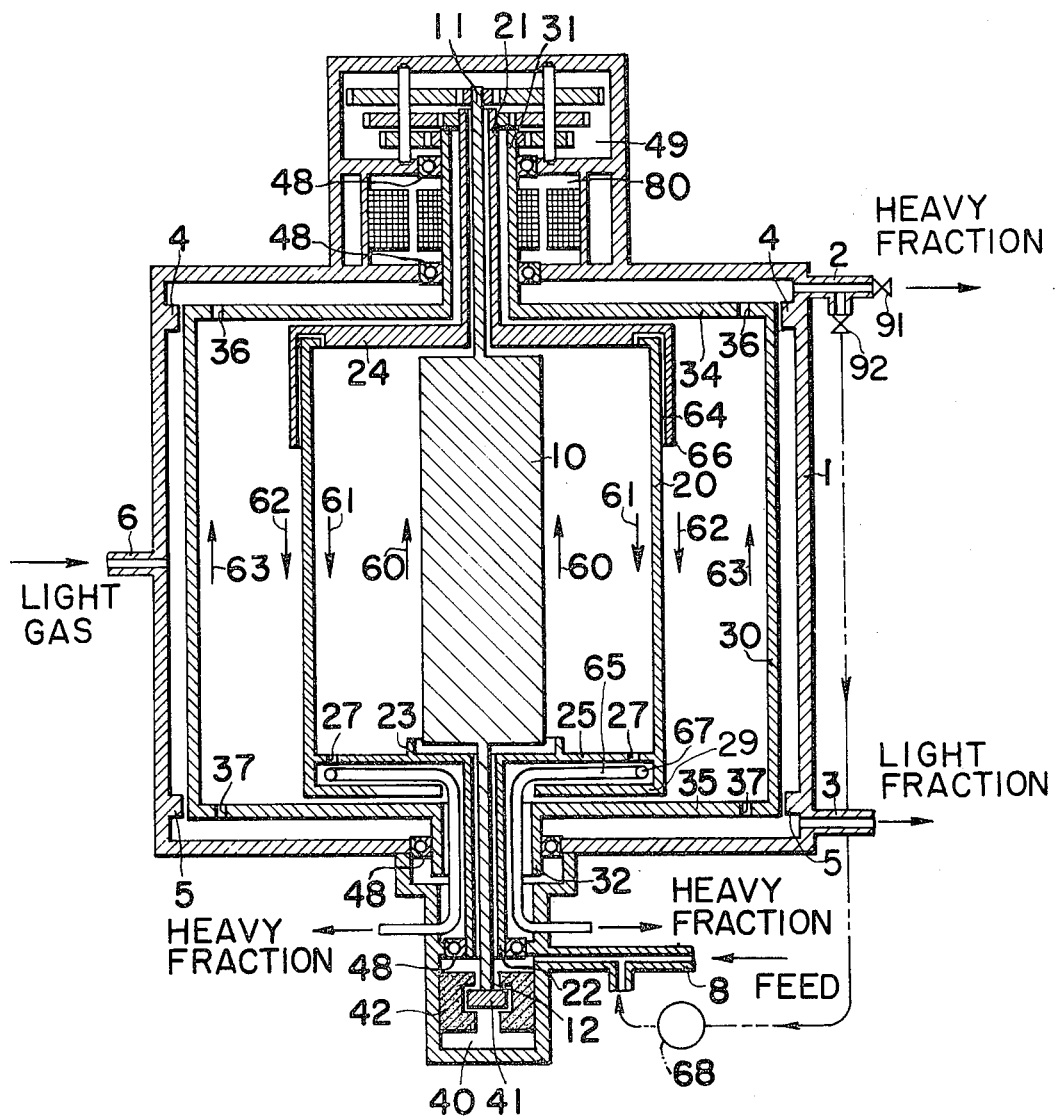

FIGS. 6 and 7 show centrifuges having three concentric rotors. In FIG. 6, the rotation of a shaft 31 of a third rotor 30 driven by a high-frequency motor 80 rotates the shafts of the first rotor and the second rotor, respectively, through a multiplication gear device 49.

A mixture to be separated is fed into a first intermediate space formed between the first rotor 10 and the second rotor 20 by the same method as in the embodiment of FIG. 3. The gas flow in the first intermediate space is shown by arrows 60 and 61 in FIG. 6. The heavy fraction is discharged from the centrifuge through holes 27 in the end plate 25 of the second rotor 20 and hence through a scoop 65 having holes 67. A guide 66 integral with the second rotor and having a slit 64 along the entire circumference thereof leads the light fraction into a second intermediate space, forming an uniform flow along the outer circumferential wall of the second rotor. The gas flow in the second intermediate space is shown by arrows 62 and 63. The heavy and the light fractions are discharged from the centrifuge through pipes 2 and 3 by way of holes 36 and 37 formed in the end plates 34 and 35, respectively, of the third rotor 30. In this case, the heavy fraction discharged through the pipe 2 may be fed again into the first intermediate space through a pump 68, acting as a pressure increasing device, together with a feed material, as a valve 91 is closed and a valve 92 is fully opened. The centrifuge is thus so arranged that by itself it forms a cascade.

The embodiment shown in FIG. 7 also has three concentric rotors. However, in this embodiment, the interior of the first rotor is also used as a centrifuge. The gas to be separated is fed into the first rotor through a hollow rotary shaft 19 at the upper end of the first rotor 10, and the upper and the lower end plates 14 and 15 of the first rotor 10 and the lower and upper end plates 24 and 25 of the second rotor 20 are provided with a plurality of holes 16, 17, 26 and 27, respectively, as if the interiors of the three rotors were to be used as single rotors. The heavy fraction and the light fraction are respectively withdrawn by scoops 74 and 75 having holes 76 and 77, respectively, located in the third rotor. The circulating flow consists of downward flow shown by arrows 70 and 71 and upward flow shown by arrow 72.

Many modifications may be made to the embodiments described above.

What is claimed is:

1. A process for separating a gas mixture into a light fraction and a heavy fraction comprising the steps of:

providing at least one cylindrical annular space formed between the vertical gas-tight cylindrical side walls of at least two coaxial rotors, said at least one annular space being defined at the upper and lower ends thereof by end walls of one of said rotors:

introducing the gas mixture into said at least one annular space;

subjecting said gas mixture to centrifugal forces by rotating said at least two rotors, the inner rotor being rotated faster than the outer rotor, thus separating in said annular space said gas mixture into a light fraction and a heavy fraction; and discharging at least one of said separated light and heavy fractions from said annular space through at least one of said upper and lower end walls of said one rotor.

2. A process as claimed in claim 1, wherein a plurality of annular spaces are provided between gas-tight cylindrical side walls of more than two rotors; the process comprising the steps of introducing said gas mixture into a first innermost of said annular spaces; subjecting said gas mixture in said first annular space to centrifugal forces by rotating the innermost rotor faster than the next outermost rotor to separate said gas mixture into a light fraction and a heavy fraction; discharging one of said fractions from said first innermost annular space to the outside of the system through one of said upper and lower end walls of said one rotor; discharging the other fraction from said first innermost annular space through one of said upper and lower end walls of said one rotor and introducing said other fraction into a second next outwardly adjacent annular space; subjecting said thus introduced other fraction to further separation into a light fraction and a heavy fraction by subjecting said introduced other fraction to centrifugal forces by rotation of the rotors defining said second annular space; and discharging one of the fractions separated in said second annular space through one of the upper and lower end walls of the rotor defining the ends of said second annular space and introducing said thus discharged separated fraction from said second annular space into a third next outermost annular space.

3. A process as claimed in claim 1, wherein said gas mixture to be separated is initially introduced into all of the annular spaces of said at least one annular space.

4. A process as claimed in claim 1, wherein more than two annular spaces are provided between gas-tight cylindrical side walls of more than three rotors;

the process comprising steps of introducing said gas mixture to be separated into a middle first annular space;

subjecting said gas mixture to centrifugal forces by rotating the inner rotor defining said first annular space faster than the outer rotor defining said first annular space to separate said gas mixture into a first fraction and a second fraction;

discharging said first fraction from the first annular space through one of the upper and lower end walls of the rotor defining the ends of said first annular space and introducing said first fraction into the outwardly adjacent second annular space and further separating it into a further first fraction and a further second fraction by subjecting it to centrifugal forces by rotating the rotors defining said second annular space;

discharging said second fraction from said first annular space through one of the upper and lower end walls of said rotor defining the ends of said first annular spaces and introducing said second fraction into the inwardly adjacent third annular space and further separating it into a yet further first fraction and a yet further second fraction by subjecting it to centrifugal forces by rotating the rotors defining said third annular space; discharging said further second separated fraction from said second annular space and introducing said further second fraction into said first annular space;

discharging said yet further first separated fraction from said third annular space and introducing said yet further first fraction into said first annular space, whereby forming a self-cascade; and discharging said further first and yet further second fractions out of said system from said second and third annular spaces, respectively.

5. A process as claimed in claim 1, further comprising introducing a light gas having a lower molecular weight than said gas mixture to be separated into said annular space together with said gas mixture.

6. A centrifuge for separating a gas mixture into a light fraction and a heavy fraction comprising:

a cylindrical stationary housing;

a first hollow centrifugal drum disposed within said stationary housing and having a gas-tight cylindrical side wall and upper and lower end walls;

a supply line for supplying the gas mixture to be separated extending through one of said end walls;

a discharge line for the separated light and heavy fractions extending through at least one of said upper and lower end walls;

a second centrifugal rotary member disposed concentrically within said first hollow centrifugal drum and having a gas-tight cylindrical side wall, said cylindrical walls of said drum and said rotary member defining therebetween an annular space; and means for rotating said second centrifugal rotary member at a faster speed than said first hollow centrifugal drum.

7. A centrifuge as claimed in claim 6, wherein said second centrifugal rotary member is a solid rotor.

8. A centrifuge as claimed in claim 6, wherein said second centrifugal rotary member is a hollow rotor.

9. A centrifuge as claimed in claim 6, further comprising a third hollow centrifugal drum having a gas-tight cylindrical side wall and upper and lower end walls through at least one of which said supply line and said discharge line are provided, said third drum being concentrically disposed between said first drum and said second rotary member and defining therebetween first and second annular spaces, respectively.

10. A centrifuge as claimed in claim 9, further comprising means for introducing said gas mixture to be separated into at least one of said annular spaces, means for discharging one of the fractions separated within said one annular space to the outside of said stationary housing, and means for introducing the other of the fractions separated within said one annular space into the other of said annular spaces.

11. A centrifuge as claimed in claim 9, further comprising means defining a third annular space, means for introducing said gas mixture to be separated into at least the middle one of said annular spaces, means for introducing one of the fractions separated within said middle annular space into an inwardly adjacent annular space, and means for introducing the other of the fractions separated within said middle annular space into an outwardly adjacent annular space.

* * * * *